(12) United States Patent
De Jonghe et al.

(10) Patent No.: US 7,608,178 B2
(45) Date of Patent: Oct. 27, 2009

(54) ACTIVE METAL ELECTROLYZER

(75) Inventors: Lutgard De Jonghe, Lafayette, CA (US); Steven J. Visco, Berkeley, CA (US); Yevgeniy S. Nimon, Danville, CA (US)

(73) Assignee: PolyPlus Battery Company, Berkeley, CA (US)

( * ) Notice: Subject to any disclaimer, the term of this patent is extended or adjusted under 35 U.S.C. 154(b) by 870 days.

(21) Appl. No.: 10/986,441

(22) Filed: Nov. 10, 2004

(65) Prior Publication Data

US 2005/0100793 A1    May 12, 2005

Related U.S. Application Data

(60) Provisional application No. 60/518,948, filed on Nov. 10, 2003.

(51) Int. Cl.
*H01M 4/04* (2006.01)
(52) U.S. Cl. .......................... 205/50; 205/560; 205/406; 205/407; 205/408; 205/409
(58) Field of Classification Search .................. 205/50, 205/560, 406–409
See application file for complete search history.

(56) References Cited

U.S. PATENT DOCUMENTS

| | | | |
|---|---|---|---|
| 3,528,856 A | 9/1970 | Ovshinsky | |
| 3,607,417 A | 9/1971 | McRae et al. | |
| 3,615,835 A | 10/1971 | Ovshinsky | |
| 3,625,769 A | 12/1971 | Lyall | |
| 3,703,415 A | 11/1972 | Mitoff et al. | |
| 3,912,536 A | 10/1975 | Galli et al. | |
| 3,976,509 A | 8/1976 | Tsai et al. | |
| 4,007,057 A | 2/1977 | Littauer et al. | |

(Continued)

FOREIGN PATENT DOCUMENTS

EP    0111213 A2    11/1983

(Continued)

OTHER PUBLICATIONS

International Search Report dated Jan. 1, 2006 from International Application No. PCT/US2004/033424.

(Continued)

*Primary Examiner*—Arun S Phasge
(74) *Attorney, Agent, or Firm*—Weaver Austin Villeneuve & Sampson LLP

(57) ABSTRACT

Electro-winning of active metal (e.g., lithium) ions from a variety of sources including industrial waste, and recycled lithium and lithium-ion batteries is accomplished with an electrolyzer having a protected cathode that is stable against aggressive solvents, including water, aqueous electrolytes, acid, base, and a broad range of protic and aprotic solvents. The electrolyzer has a highly ionically conductive protective membrane adjacent to the alkali metal cathode that effectively isolates (de-couples) the alkali metal electrode from solvent, electrolyte processing and/or cathode environments, and at the same time allows ion transport in and out of these environments. Isolation of the cathode from other components of a battery cell or other electrochemical cell in this way allows the use of virtually any solvent, electrolyte and/or anode material in conjunction with the cathode. The electrolyzer can be configured and operated to claim or reclaim lithium or other active metals from such sources.

20 Claims, 4 Drawing Sheets

U.S. PATENT DOCUMENTS

| | | | |
|---|---|---|---|
| 4,091,182 A | 5/1978 | Farrington et al. |
| 4,162,202 A | 7/1979 | Dey |
| 4,163,084 A | 7/1979 | Tsai et al. |
| 4,210,707 A | 7/1980 | Farrington |
| 4,402,995 A | 9/1983 | Fleischer |
| 4,405,416 A | 9/1983 | Raistrick et al. |
| 4,414,293 A | 11/1983 | Joy et al. |
| 4,833,048 A | 5/1989 | De Jonghe et al. |
| 4,917,974 A | 4/1990 | Visco et al. |
| 4,981,672 A | 1/1991 | De Neufville et al. |
| 4,985,317 A | 1/1991 | Adachi et al. |
| 5,100,523 A | 3/1992 | Helms et al. |
| 5,108,856 A | 4/1992 | Shuster |
| 5,162,175 A | 11/1992 | De Jonghe et al. |
| 5,166,011 A | 11/1992 | Rao et al. |
| 5,198,081 A * | 3/1993 | Kanoh et al. ............. 205/560 |
| 5,213,908 A | 5/1993 | Hagedorn |
| 5,314,765 A | 5/1994 | Bates |
| 5,336,384 A | 8/1994 | Tsou et al. |
| 5,338,625 A | 8/1994 | Bates et al. |
| 5,342,710 A | 8/1994 | Koksbang |
| 5,387,479 A | 2/1995 | Koksbang |
| 5,409,786 A | 4/1995 | Bailey |
| 5,427,873 A | 6/1995 | Shuster |
| 5,455,126 A | 10/1995 | Bates et al. |
| 5,506,068 A | 4/1996 | Dan et al. |
| 5,510,209 A | 4/1996 | Abraham et al. |
| 5,512,147 A | 4/1996 | Bates et al. |
| 5,516,598 A | 5/1996 | Chu et al. |
| 5,523,179 A | 6/1996 | Chu |
| 5,525,442 A | 6/1996 | Shuster |
| 5,532,077 A | 7/1996 | Chu |
| 5,567,210 A | 10/1996 | Bates et al. |
| 5,569,520 A | 10/1996 | Bates |
| 5,582,623 A | 12/1996 | Chu |
| 5,597,660 A | 1/1997 | Bates et al. |
| 5,612,152 A | 3/1997 | Bates |
| 5,648,187 A | 7/1997 | Skotheim |
| 5,652,068 A | 7/1997 | Shuster et al. |
| 5,665,481 A | 9/1997 | Shuster et al. |
| 5,686,201 A | 11/1997 | Chu |
| 5,696,201 A | 12/1997 | Cavalloni et al. |
| 5,702,995 A | 12/1997 | Fu |
| 5,789,108 A | 8/1998 | Chu |
| 5,814,420 A | 9/1998 | Chu |
| 5,882,812 A | 3/1999 | De Jonghe et al. |
| 5,961,672 A | 10/1999 | Skotheim et al. |
| 6,017,651 A | 1/2000 | Chu et al. |
| 6,025,094 A | 2/2000 | Visco et al. |
| 6,030,720 A | 2/2000 | Chu et al. |
| 6,030,909 A | 2/2000 | Fu |
| 6,068,950 A | 5/2000 | Gan et al. |
| 6,096,447 A | 8/2000 | Gan et al. |
| 6,110,236 A | 8/2000 | Chu et al. |
| 6,146,787 A | 11/2000 | Harrup et al. |
| 6,165,644 A | 12/2000 | Chu et al. |
| 6,183,901 B1 | 2/2001 | Ying et al. |
| 6,198,701 B1 | 3/2001 | De Jonghe et al. |
| 6,200,701 B1 | 3/2001 | Gan et al. |
| 6,200,704 B1 | 3/2001 | De Jonghe et al. |
| 6,203,942 B1 | 3/2001 | Gan et al. |
| 6,210,832 B1 | 4/2001 | Chu et al. |
| 6,214,061 B1 | 4/2001 | Visco et al. |
| 6,225,002 B1 | 5/2001 | Chu et al. |
| 6,228,527 B1 | 5/2001 | Medeiros et al. |
| 6,248,481 B1 | 6/2001 | De Jonghe et al. |
| 6,274,269 B1 | 8/2001 | Gan et al. |
| 6,280,598 B1 | 8/2001 | Barton et al. |
| 6,315,881 B1 | 11/2001 | Fu |
| 6,358,643 B1 | 3/2002 | Katz et al. |
| 6,358,651 B1 | 3/2002 | Chen et al. |
| 6,376,123 B1 | 4/2002 | Chu |
| 6,391,492 B1 | 5/2002 | Kawakami et al. |
| 6,402,795 B1 | 6/2002 | Chu et al. |
| 6,413,284 B1 | 7/2002 | Chu et al. |
| 6,413,285 B1 | 7/2002 | Chu et al. |
| 6,432,584 B1 | 8/2002 | Visco et al. |
| 6,475,677 B1 | 11/2002 | Inda et al. |
| 6,485,622 B1 | 11/2002 | Fu |
| 6,489,055 B1 | 12/2002 | Ichihashi et al. |
| 6,495,285 B2 | 12/2002 | Gan et al. |
| 6,511,772 B2 | 1/2003 | Gan et al. |
| 6,537,698 B2 | 3/2003 | Gan et al. |
| 6,537,701 B1 | 3/2003 | Chu et al. |
| 6,632,573 B1 | 10/2003 | Nimon et al. |
| 6,723,140 B2 | 4/2004 | Chu et al. |
| 6,737,197 B2 | 5/2004 | Chu et al. |
| 6,770,187 B1 * | 8/2004 | Putter et al. ............. 205/560 |
| 6,797,428 B1 | 9/2004 | Skotheim et al. |
| 6,835,492 B2 | 12/2004 | Cho et al. |
| 6,911,280 B1 | 6/2005 | De Jonghe et al. |
| 6,955,866 B2 | 10/2005 | Nimon et al. |
| 6,991,662 B2 | 1/2006 | Visco et al. |
| 7,070,632 B1 | 7/2006 | Visco et al. |
| 7,211,532 B2 | 5/2007 | Fu |
| 7,247,408 B2 | 7/2007 | Skotheim et al. |
| 7,282,295 B2 | 10/2007 | Visco |
| 7,282,302 B2 | 10/2007 | Visco et al. |
| 7,390,591 B2 | 6/2008 | Visco et al. |
| 2001/0041294 A1 | 11/2001 | Chu et al. |
| 2002/0012846 A1 | 1/2002 | Skotheim et al. |
| 2002/0034688 A1 | 3/2002 | Chu et al. |
| 2002/0102465 A1 | 8/2002 | Chen et al. |
| 2004/0197641 A1 | 10/2004 | Visco et al. |
| 2005/0100793 A1 | 5/2005 | Jonghe et al. |
| 2005/0175894 A1 | 8/2005 | Visco et al. |
| 2005/0208353 A1 | 9/2005 | Johnson |
| 2006/0078790 A1 | 4/2006 | Nimon et al. |
| 2007/0087269 A1 | 4/2007 | Inda |
| 2007/0117026 A1 | 5/2007 | Kumar et al. |
| 2007/0231704 A1 | 10/2007 | Inda |

FOREIGN PATENT DOCUMENTS

| | | |
|---|---|---|
| EP | 0111214 B1 | 11/1983 |
| EP | 0 838 441 A2 | 4/1998 |
| EP | 0875951 A1 | 11/1998 |
| EP | 0689260 B1 | 4/1999 |
| EP | 1 162 675 A2 | 12/2001 |
| JP | 55081471 | 6/1980 |
| JP | 62-243247 | 10/1987 |
| JP | 09320645 | 12/1997 |
| WO | WO 99/57770 | 11/1999 |
| WO | WO 02/50933 A2 | 6/2002 |
| WO | WO 02/50933 A3 | 6/2002 |
| WO | WO 2005/038953 A2 | 4/2005 |
| WO | WO 2005/038962 A2 | 4/2005 |

OTHER PUBLICATIONS

Galbraith, A.D., "The lithium-water-air battery for automotive propulsion", XP002355800, retrieved from STN Database accession No. 1979:106901 abstract and Symp. Int. Veh. Electr., RAPP, 4$^{th}$ vol. 1, Paper 32.4, 23 pp., Publisher: Electr. Veh. Counc., New York, N.Y. Coden: 39UPAD, 1976.

U.S. Appl. No. 10/772,228, Office Action mailed Sep. 21, 2007.
U.S. Appl. No. 10/824,944, Notice Of Allowance mailed Jul. 31, 2007.
U.S. Appl. No. 10/824,944, Allowed Claims.
U.S. Appl. No. 11/245,472, Office Action mailed Aug. 23, 2007.
U.S. Appl. No. 10/686,189, Notice Of Allowance mailed Jun. 8, 2007.
U.S. Appl. No. 10/686,189, Allowed Claims.
International Search Report dated Jan. 16, 2006 from International Application No. PCT/US2004/033361.

Inaguma et al., "High Ionic Conductivity in Lithium Lanthanum Titanate", Solid State Communications, vol. 86, No. 10, pp. 689-693, 1993.

Kobayashi et al., "All-solid-state lithium secondary battery with ceramic/polymer composite electrolyte", Solid State Ionics 152-153 (2002) 137-142.

China patent application No. 2003801061464, First Office Action mailed Oct. 27, 2006.

Will, et al., "Primary Sodium Batteries with Beta-Alumina Solid Electrolyte", J. Electrochemical Science and Technology, Apr. 1975, vol. 122, No. 4, pp. 457-461.

U.S. Appl. No. 10/731,771, Office Action mailed Mar. 16, 2007.

Nippon Telegr & Teleph Corp., "Patent Abstracts of Japan," vol. 008, No. 119 (E-248), Jun. 5, 1984 & JP 59 031573 A, Feb. 20, 1984.

Anders et al., "Plasma is Produced Simply", R&D Research & Development, R&D Magazine, vol. 39, No. 10, Sep. 1997, www.rdmag.com, p. 65.

Steven D. Jones, et al., "Thin film rechargeable Li batteries", 1994, *Solid State Ionics*.

J.B. Bates, et al., "Thin-film rechargeable lithium batteries," 1995, *Journal of Power Sources*.

N. J. Dudney, et al., "Sputtering of lithium compounds for preparation of electrolyte thin films,"1992, *Solid State Ionics*.

J. B. Bates, et al., "Electrical properties of amorphous lithium electrolye thin films," 1992, *Solid State Ionics*.

Xiaohua Yu, et al, "A Stable Thin-Film Lithium Electrolyte: Lithium Phosphorus Oxynitride," Feb. 1997, *J. Electrochem. Soc.*, vol. 144, No. 2.

Fu, Jie, "Fast Li+ Ion Conduction in Li2O-Al2O3-TiO2-SiO2-P2O5 Glass-Ceramics", Journal of the American Ceramics Society, vol. 80, No. 7, Jul. 1997, pp. 1-5.

Aono et al., "Ionic Conductivity of the Lithium Titanium Phosphate $(Li_{1+x}M_xTi_{2-x}(PO_4)_3$, M=Al, Sc, Y, and La) Systems", Dept. of Industrial Chemistry, pp. 590-591.

Aono, Hiromichi, "High Li+ Conducting Ceramics", Acc. Chem. Res. vol. 27, No. 9, 1994, pp. 265-270.

Aono, et al., "Ionic Conductivity and Sinterability of Lithium Titanium Phosphate System", Solid State Ionics, 40/41 (1990), pp. 38-42.

Aono, et al., "Electrical properties and crystal structure of solid electrolyte based on lithium hafnium phosphate $LiHf_2(PO_4)_3$", Solid State Ionics 62 (1993), pp. 309-316.

Aono, et al., "Electrical property and sinterability of $LiTi_2(PO_4)_3$ mixed with lithium salt ($Li_3PO_4$ or $Li_3BO_3$)", Solid State Ionics 47 (1991) pp. 257-264.

Aono, et al., "Ionic Conductivity of $\beta Fe_2(SO_4)_3$ Type $Li_3Cr_2(PO_4)_3$ Based Electrolyte", Chemistry Letters, 1993, pp. 2033-2036.

Aono, et al., "Ionic Conductivity of $LiTi_2(PO_4)_3$ Mixed with Lithium Salts", Chemistry Letters, 1990, pp. 331-334.

Fu, Jie, "Superionic conductivity of glass-ceramics in the system $Li_2O$-$Al_2O_3$-$TiO_3$- $P_2O_5$", Solid State Ionics, 96 (1997), pp. 195-200.

Fu, Jie, "Fast Li+ ion conducting glass-ceramics in the system $Li_2O$-$Al_2O_3$-$GeO_2$- $P_2O_5$" Solid State Ionics 104 (1997), pp. 191-194.

Aono, et al., "DC Conductivity of $Li_{1.3}Al_{0.3}Ti_{1.7}(PO_4)_3$ Ceramic with Li Electrodes", Chemistry Letters, 1991, pp. 1567-1570.

Aono, et al., "Electrical Properties of Sintered Lithium Titanium Phosphate Ceramics ($Li_{1+x}M_xTi_{2-x}PO_4)_3, M^{3+}=Al^{3+}, Sc^{3+}, or Y^{3+}$)", Chemistry Letters, 1990, pp. 1825-1828.

Button, et al., "Structural disorder and enhanced ion transport in amorphous conductors", Solid State Ionics, Vols. 9-10, Part 1, Dec. 1983, pp. 585-592 (abstract).

Shuster, Nicholas, "LithiumWater Power Source for Low Power—Long Duration Undersea Applications", Westinghouse Electric Corporation, 1990 IEEE, pp. 118- 123.

VanVoorhis, et al., "Evaluation of Air Cathodes for Lithium/Air Batteries", Electrochemical Society Proceedings vol. 98-16, 1999, pp. 383-390.

Blurton et al., "Metal/Air Batteries: Their Status and Potential—A Review", Journal of Power Sources, 4, (1979), pp. 263-279.

J. Read, "Characterization of the Lithium/Oxygen Organic Electrolyte Battery", Journal of The Electrochemical Society, 149 (9) (2002), pp. A1190-A1195.

Abraham et al., "A Polymer Electrolyte-Based Rechargeable Lithium/Oxygen Battery", Technical Papers, Electrochemical Science and Technology, J. Electrochem. Soc., vol. 143, No. 1, Jan. 1996, pp. 1-5.

Kessler, et al., "Large Microsheet Glass for 40-in. Class PALC Displays", 1997, FMC2-3, pp. 61-63.

Feng et al., "Electrochemical behavior of intermetallic-based metal hydrides used in Ni/metal hydride (MH) batteries: a review", International Journal of Hydrogen Energy, 26 (2001), pp. 725-734.

Iwakura et al., "All solid-state nickel/metal hydride battery with a proton-conductive phosphoric acid-doped silica gel electrolyte", Electrochimica Acta 48 (2003), pp. 1499-1503.

Li et al., "Lithium-Ion Cells with Aqueous Electrolytes", J. Electrochem. Soc., vol. 142, No. 6, Jun. 1995, pp. 1742-1746.

Zhang et al., "Electrochemical Lithium Intercalation in $VO_2(B)$ in Aqueous Electrolytes", J. Electrochem. Soc., vol. 143, No. 9, Sep. 1996, pp. 2730-2735.

Urquidi-Mcdonald, Mirna, "Hydrogen storage and semi-fuel cells", http://engr.psu.edu/h2e/Pub/Macdonald1.htm, (downloaded Jan. 27, 2004, 3 pages).

Urquidi-Mcdonald, et al., "Lithium/poly(organophosphazene) membrane anodes in KOH and seawater", Electrochimica Acta 47, (2002), pp. 2495-2503.

Nimon et al., "Stability of Lithium Electrode in Contact with Glass Electrolytes", SSI-14, Jun. 22-27, 2003, Monterey, CA. (conference poster).

Nimon et al., "Stability of Lithium Electrode in Contact with Glass Electrolytes", SSI-14 Conference, Monterey, CA., Jun. 22, 2003, Abstract of Poster.

U.S. Appl. No. 10/686,189, Office Action mailed Apr. 11, 2007.

European Examination Report dated Mar. 21, 2006 from related European Application No. 03809186.4.

International Search Report dated Mar. 6, 2006 from International Application No. PCT/US2004/033371.

Thokchom, Joykumar S., et al., "Water Durable Lithium Ion Conducting Composite Membranes from the $Li_2O$-$Al_2O_3$-$TiO_2$-$P_2O_5$ Glass Ceramic", *Journal of The Electrochemical Society,* 154 (4), 2007, pp. A331-A336.

U.S. Appl. No. 10/772,228, Office Action mailed Sep. 21, 2007.

U.S. Appl. No. 10/772,228, Notice Of Allowance mailed Jan. 22, 2008.

U.S. Appl. No. 10/772,228, Allowed Claims.

U.S. Appl. No. 10/772,157, Office Action mailed Feb. 6, 2008.

U.S. Appl. No. 10/772,157, Office Action mailed Nov. 1, 2007.

U.S. Appl. No. 10/825,587, Office Action mailed Apr. 1, 2008.

U.S. Appl. No. 10/825,587, Office Action mailed Jun. 25, 2007.

U.S. Appl. No. 10/731,771, Notice Of Allowance mailed Jul. 10, 2007.

U.S. Appl. No. 10/731,771, Allowed Claims.

International Search Report dated Mar. 6, 2006 from International Application No. PCT/US2004/033424.

West, et al., "Chemical stability enhancement of lithium conducting solid electrolyte plates using sputtered LiPON thin films," Journal of Power Sources, vol. 126, Issues 1-2, pp. 1-272 (Feb. 16, 2004).

European patent application No. 04794699.1, Examination Report dated May 31, 2007.

Visco, et al., "Ionically Conductive Composites for Protection of Active Metal Anodes," PolyPlus Battery Company, U.S. Appl. No. 10/686,189, filed Oct. 14, 2003, pp. 1-48.

International Search Report dated Oct. 18, 2005 from related International Application No. PCT/US2004/033372.

U.S. Office Action mailed Jun. 16, 2006, from U.S. Appl. No. 11/092,781.

De Jonghe, et al., "Chemical Protection of a Lithium Surface," PolyPlus Battery Company, Appl. No. 11/092,781, filed Mar. 28, 2005, pp. 1-34.

U.S. Office Action mailed Sep. 7, 2006, from U.S. Appl. No. 10/824,944.

Visco et al., "Protected Active Metal Electrode and Battery Cell Structures with Non-Aqueous Interlayer Architecture," PolyPlus Battery Company, U.S. Appl. No. 10/824,944, filed Apr. 14, 2004, pp. 1-46.

Visco et al., "Active Metal Fuel Cells," PolyPlus Battery Company, U.S. Appl. No. 10/825,587, filed Apr. 14, 2004, pp. 1-27.

Visco et al., "Ionically Conductive Membranes for Protection of Active Metal Anodes and Battery Cells," PolyPlus Battery Company, U.S. Appl. No. 10/772,228, filed Feb. 3, 2004, pp. 1-50.

Visco, et al., "Ionically Conductive Composites for Protection of Active Metal Anodes," PolyPlus Battery Company, U.S. Appl. No. 10/731,771, filed Dec. 5, 2003, pp. 1-43.

Visco, et al., "Active Metal/Aqueous Electrochemical Cells and Systems," PolyPlus Battery Company, U.S. Appl. No. 10/772,157, filed Feb. 3, 2004, pp. 1-89.

CN patent application No. 200480037293.5, Office Action mailed Aug. 22, 2008.

EP patent application No. 04794699.1, Examination Report mailed Aug. 5, 2008.

U.S. Appl. No. 10/825,587, Office Action mailed Oct. 16, 2008.

U.S. Appl. No. 10/825,587, Office Action mailed Jun. 5, 2008.

AU patent application No. 2003301383, Examination Report mailed Sep. 29, 2008.

Foster, D.L. et al., *"Ceramic Membranes for Lithium Batteries"*, Proceeding of the 42$^{nd}$ Power Sources Conference, Jun. 2006.

WO patent application No. PCT/US06/48755, International Serch Report mailed Apr. 7, 2008.

WO patent application No. PCT/US06/48755, Written Opinion mailed Apr. 7, 2008.

U.S. Appl. No. 10/825,587, Notice Of Allowance mailed Nov. 24, 2008.

U.S. Appl. No. 10/825,587, Allowed Claims.

CN patent application No. 200480042697.3, Office Action mailed Feb. 15, 2008.

U.S. Appl. No. 11/245,472, Office Action mailed Jul. 24, 2008.

U.S. Appl. No. 10/772,157, Office Action mailed Jul. 11, 2008.

U.S. Appl. No. 10/772,157, Office Action mailed Dec. 30, 2008.

U.S. Appl. No. 11/824,574, Office Action mailed Dec. 31, 2008.

CN patent application No. 200480042697.3, Office Action mailed Dec. 19, 2008.

U.S. Appl. No. 11/245,472, Office Action mailed Jan. 8, 2009.

U.S. Appl. No. 11/824,579, Office Action mailed Jan. 29, 2009.

U.S. Appl. No. 11/824,548, Office Action mailed Jan. 26, 2009.

* cited by examiner

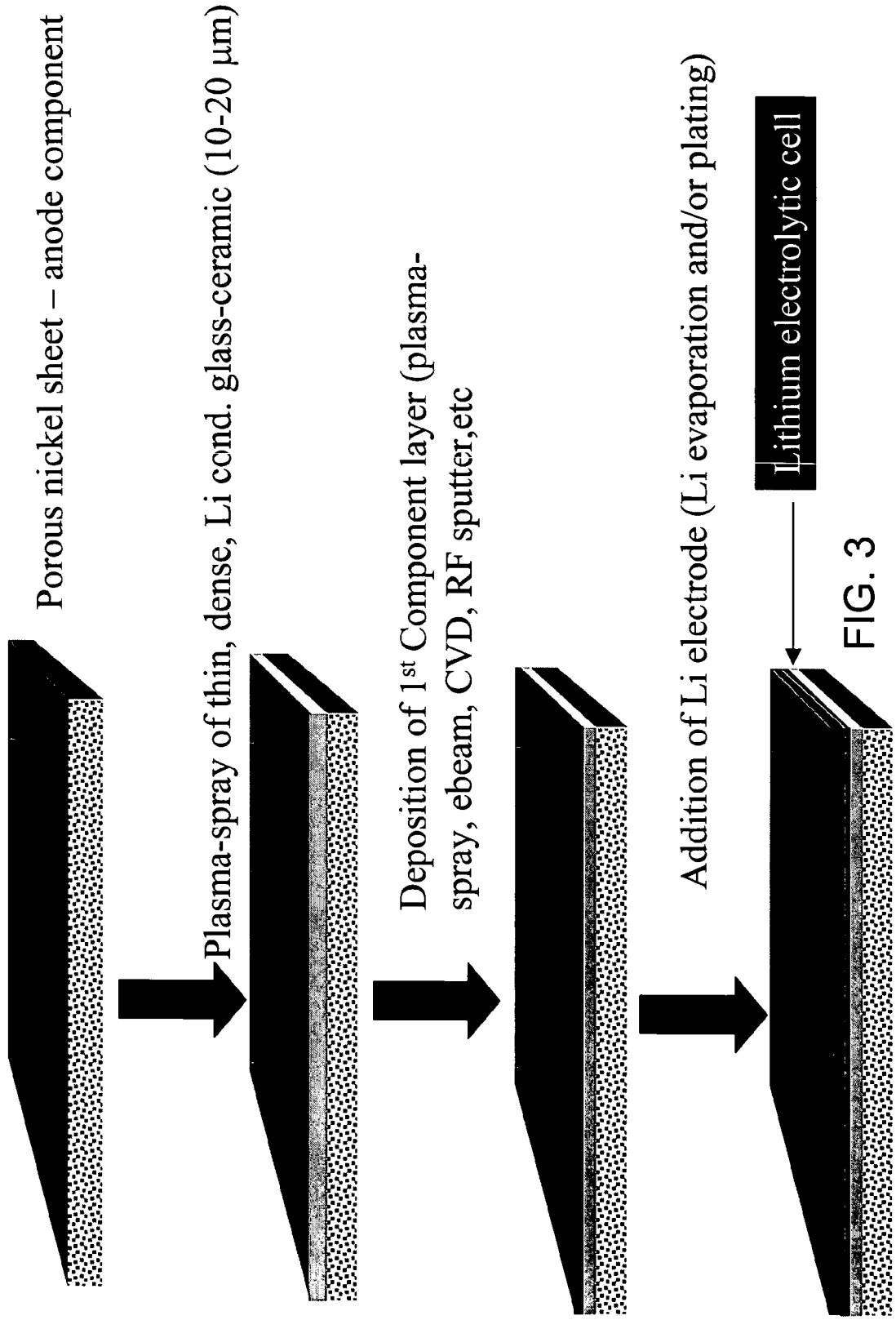

ACTIVE METAL ELECTROLYZER

CROSS-REFERENCE TO RELATED APPLICATIONS

This application claims priority to U.S. Provisional Patent Application No. 60/518,948 filed Nov. 10, 2003, titled BI-FUNCTIONALLY COMPATIBLE IONICALLY COMPOSITES FOR ISOLATION OF ACTIVE METAL ELECTRODES IN A VARIETY OF ELECTROCHEMICAL CELLS AND SYSTEMS. This prior application is incorporated herein by reference in its entirety and for all purposes.

BACKGROUND OF THE INVENTION

1. Field of the Invention

The present invention relates generally to active metal electrochemical devices and processes. More particularly, this invention relates to active metal/aqueous (e.g., lithium) electrochemical cell configured and operated to reclaim lithium (or other active) metal from a variety of sources including industrial waste, and recycled lithium and lithium-ion and other active metal batteries. These electrolyzer cells are made possible by active metal electrode structures having ionically conductive membranes for protection of the active metal from deleterious reaction with air and moisture.

2. Description of Related Art

The low equivalent weight of alkali metals, such as lithium, render them particularly attractive as a battery electrode component. Lithium provides greater energy per volume than the traditional battery standards, nickel and cadmium. As a result, lithium-ion battery technology has developed rapidly and is taking a growing share of the rechargeable battery market. Lithium metal battery technology, which offers even higher energy density than Li-ion, is developing and can be expected to become an important part of the market for rechargeable batteries before long. These and other industrial uses of lithium provide a substantial and growing waste disposal problem.

It is widely known that lithium and other active metals metal react violently with water, aqueous solutions and a variety of other common easily handled solvents. Accordingly, previous attempts to recover lithium or other active metals have relied upon high temperatures using anhydrous molten salt, which is a difficult and expensive process.

There is a substantial an increasing need and value from both an environmental and economic standpoint in reclaiming lithium in industrial processes and particularly from spent lithium and other active metal battery cells.

Thus, improved lithium recovery processes are needed.

SUMMARY OF THE INVENTION

The present invention concerns the electro-winning of active metal (e.g., lithium) ions from a variety of sources including industrial waste, and recycled lithium and lithium-ion batteries. An electrolyzer in accordance with the present invention has a protected active metal electrode (cathode) that is stable against aggressive solvents, including water, aqueous electrolytes, acid, base, and a broad range of protic and aprotic solvents. The electrolyzer has a highly ionically conductive protective membrane adjacent to the alkali metal electrode that effectively isolates (de-couples) the alkali metal electrode from solvent, electrolyte processing and/or anode environments, and at the same time allows ion transport in and out of these environments. Isolation of the cathode from other components of a battery cell or other electrochemical cell in this way allows the use of virtually any solvent, electrolyte and/or anode material in conjunction with the cathode.

An electrolyzer in accordance with the invention may be used to recover lithium from spent lithium metal and lithium-ion cells. Such cells could be ground up and mixed with water to dissolve the lithium salts, and then electrolyzed to produce pure lithium metal by plating through the protective composite. The same approach could be applied to recovering other active metals for spent batteries, and claiming or reclaiming lithium and other active metals from industrial waste or other sources. Recovery of lithium or other active metals in this way has the beneficial result of reducing environmental contamination as well as the economic benefit of producing a valuable pure metal for reuse.

Processes in accordance with the present invention can be advantageously conducted room temperature in aqueous solutions. The invention is not limited to room temperature, and may also be used at sub-ambient as well as elevated temperatures. This invention also provides for the electro-winning of lithium from low temperature molten salts as well as high temperature molten salts.

In one aspect, the invention pertains to a method of claiming active metal from an active metal ion source. The method involves providing an active metal ion source in a liquid phase that is corrosive to active metal at the anode of an electrolytic cell that is compatible with the liquid phase, and electrolyzing the active metal ion source with the electrolytic cell to obtain active metal at the cathode of the electrolytic cell. The active metal is generally obtained in the solid state, and in a preferred embodiment, the active metal ion source in the liquid phase comprises an active metal salt dissolved in a solvent that is corrosive to active metal. Again, in a preferred embodiment the solvent in aqueous. In this case, the method can involve dissolving an active metal salt in an aqueous solvent (e.g., water) to form an aqueous solution and then electrolyzing the active metal salt solution with a electrolytic cell that is compatible with the solvent to obtain active metal at the cathode.

In another aspect, the invention pertains to an electrolytic cell. The cell includes an active metal cathode or substrate having a first surface and a second surface and an anode structure having an electronically conductive component, an ionically conductive component, and an electrochemically active component. The electronically active component has or is a source of active metal ions and at least one of the cathode structure components has or is a constituent that is corrosive to active metal. The cell also has an ionically conductive protective membrane on the first surface of the cathode. The membrane has one or more materials configured to provide a first surface chemically compatible with the active metal of the cathode in contact with the anode, and a second surface substantially impervious to and chemically compatible with the anode structure and in contact with the anode structure.

In another aspect, the invention pertains to an electrolytic cell precursor. The cell precursor includes an active metal cathode or substrate having a first surface and a second surface, an anode precursor structure comprising an electronically conductive component compatible with active metal corrosive solutions, and an ionically conductive protective membrane on the first surface of the cathode. The membrane has one or more materials configured to provide a first surface chemically compatible with the active metal of the cathode in contact with the anode, and a second surface substantially impervious to and chemically compatible with active metal corrosive solutions and in contact with the anode precursor structure.

These and other features of the invention are further described in the detailed description below.

BRIEF DESCRIPTION OF THE DRAWINGS

FIG. 3 depicts important stages in the fabrication of an electrolytic cell in accordance with one embodiment of the present invention.

DETAILED DESCRIPTION OF SPECIFIC EMBODIMENTS

Figure 1:
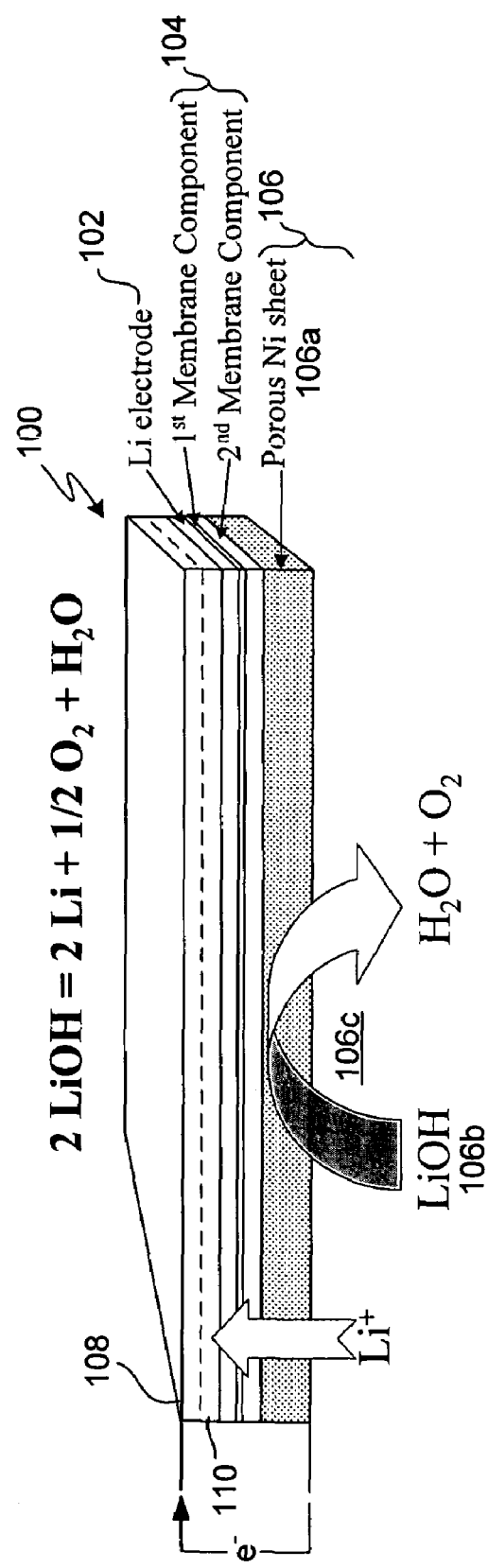
FIG. 1 is a schematic illustration of an active metal electrolyzer cell incorporating an ionically conductive protective membrane in accordance with the present invention.

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

When used in combination with "comprising," "a method comprising," "a device comprising" or similar language in this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Introduction

The present invention concerns the electro-winning of active metal (e.g., lithium) ions from a variety of sources including industrial waste, and recycled lithium and lithium-ion batteries. An electrolyzer in accordance with the present invention uses electricity to electrolyze active metal salts in aqueous or other active metal corrosive environments (e.g., LiOH) water ($H_2O$) and oxygen ($O_2$), converting electrical energy into chemical energy that can be stored for future use. The electrolyzer operates like a battery cell in reverse; using electricity to drive the oxidation of an active metal salt to active metal ions at the anode. The active metal ions then cross to the cathode via an ionic conductor where they combine electrons electrically conducted from the anode to the cathode, to form active metal.

The electrolyzer has a protective membrane between the anode and the cathode that is stable against aggressive solvents, including water, aqueous electrolytes, acid, base, and a broad range of protic and aprotic solvents. The electrolyzer has a highly ionically conductive protective membrane adjacent to the active metal electrode (cathode) that effectively isolates (de-couples) the active metal electrode from the anode environment, and at the same time allows ion transport in and out of these environments. Isolation of the cathode in this way allows for active metal reclamation from virtually any source.

For example, an electrolyzer in accordance with the invention may be used to recover lithium from spent lithium metal and lithium-ion cells. Such cells could be ground up and mixed with water to dissolve the lithium salts, and then electrolyzed to produce pure lithium metal by plating through the ionically conductive protective membrane. The same approach could be applied to recovering other active metals for spent batteries, and claiming or reclaiming lithium and other active metals from industrial waste or other sources. Recovery of lithium or other active metals in this way has the beneficial result of reducing environmental contamination as well as the economic benefit of producing a valuable pure metal for reuse.

The invention also provides an electrolyzer precursor (electrolytic cell precursor) which is effectively that portion of the cell prior to contact with an active metal ion source. The precursor may be usefully formed like the full cell but without electrochemically active material (e.g., active metal salt) in its cathode structure. The precursor is thus ready and available to electrolyze an active metal when the cathode structure is complete by contacting with an active metal salt solution, and a voltage applied.

Processes in accordance with the present invention can be advantageously conducted room temperature in aqueous solutions. The invention is not limited to room temperature, and may also be used at sub-ambient as well as elevated temperatures. This invention also provides for the electro-winning of lithium from low temperature molten salts as well as high temperature molten salts.

Electrolyzer

An electrolyzer in accordance with the present invention is an electrolytic cell having a cathode where reduction occurs and an active metal is formed and an anode where an active metal salt is oxidized. Active metal ions generated at the anode travel across an ionically conductive protective membrane where they recombine with electrons that travel from the anode to the cathode via an electrically conductive path to form active metal.

The cathode is the electrode where reduction occurs and the active metal is formed (plated) in the electrolytic reaction. The active metal is formed at the cathode as active metal ions move from the anode across the membrane, recombine with electrons and plate on the cathode. The cell may start out with a cathode that already has some active metal that is then built upon during operation of the cell. Alternatively, the cell may start out with a cathode that does not have any active metal, but has substrate suitable for plating of active metal. Such a substrate is typically a current collector, such as a sheet of copper. The current collector may also have a wetting layer on its surface to facilitate good, even plating of the active metal on the substrate.

The anode is the electrode where the oxidation occurs and an active metal salt is ionized. The anode structure includes an electronically conductive component, an ionically conductive component, and an electrochemically active component. The electronically conductive component provides electron transport from the cathode and facilitates electro-oxidation of the anode active material. The ionically conductive component provide ion transport for the active metal ions formed in the electro-oxidation reaction. The electrochemically active component is a source of active metal ions (e.g., a dissolved active metal salt or molten active meal salt). At least one anode structure component comprises a constituent that is corrosive to active metal (e.g., an aqueous solvent/electrolyte).

The protective membrane is both ionically conductive and chemically compatible with an active metal (e.g., lithium) on one side, and substantially impervious, ionically conductive and chemically compatible with the anode structure including its aqueous or other active metal corrosive constituent, on the other side.

The ionic conductivity of the membrane is at least $10^{-7}$ S/cm, generally at least $10^{-6}$ S/cm, for example at least $10^{-5}$ S/cm to $10^{-4}$ S/cm, and as high as $10^{-3}$ S/cm or higher. The cathode in contact with the first side of the protective membrane is connected with a current collector composed of a conductive metal, such as copper, that is generally inert to and does not alloy with the active metal. The anode electronically conductive component, for example, a porous catalytic electronically conductive support, is generally provided adjacent to the protective membrane on the cathode, provides electron transport from the anode (via a cathode current collector) and facilitates electro-oxidation of the anode active material.

The protective membrane may be a composite or bi-layer system composed of two or more materials that present sides having different chemical compatibility to the anode and cathode, respectively. The composite is composed of a first layer of a material that is both ionically conductive and chemically compatible with an active metal. The composite also includes second layer of a material that is substantially impervious, ionically conductive and chemically compatible with the first material and the cathode environment.

As described further below, given the protection afforded by the protective membranes of the present invention, the electrolyzer cells of the present invention can be used to recover lithium or other active metals from a wide variety of materials. Any part of the active metal electrode that is not covered by the protective membrane will generally be sealed off from the aqueous cathode environment, such as by a current collector material (e.g., copper), an o-ring seal, a crimp seal, polymer or epoxy sealant, or combination of these.

The anode side of these cells includes an anode structure with an electronically conductive component, an ionically conductive component, and an electrochemically active component, that being the active metal ion source. As described further with reference to specific embodiments below, the cells have an electronically conductive support structure electrically connected with the cathode to allow electron transfer to reduce the cathode material (e.g., $Li^+ + e^- = Li$). The electronically conductive support structure is generally porous to allow fluid flow and either catalytic (e.g., Ni, Pt) or treated with a catalyst to catalyze the oxidation of the anode material (e.g., $2LiOH = 2Li^+ + 2e^- + H_2O + \frac{1}{2}O_2$). An aqueous electrolyte with suitable ionic conductivity is generally used to dissolve (or suspend) the active metal salts and is in contact with the electronically conductive support structure to allow ion transport through the electronically conductive support structure to complete the redox reaction. Non-aqueous electrolytes or other active metal ion source liquid phases, e.g, molten salts, that are still active metal corrosive may also be used in other embodiments of the invention.

An aqueous solution of an electrochemically active component of these cells frequently has native ionic conductivity so that a single solution may act as both the electrochemically active component and the ionically conductive component in an aqueous embodiment of the invention.

FIG. 1 illustrates an active metal electrolyzer cell in accordance with one embodiment of the present invention in which an aqueous active metal salt is the active metal ion source. The cell 100 includes a lithium electrode (cathode) 102. Alternatively, another active metal, particularly an alkali metal, may be used. The lithium metal electrode can be bonded to a lithium ion conductive protective membrane 104 according to any of the techniques described herein and in the patent applications incorporated by reference, as described below, with or without the use of a bond coat such as a thin layer of Ag, Al, Sn or other suitable bonding or wetting layer, depending upon the technique used. The cathode active material (active metal) is formed during operation of the cell by plating through the protective membrane 104 onto a cathode current collector 108, as described in detail below. A wetting layer 110 may be present on the current collector 108.

The cell 100 also includes an anode structure 106 composed of a porous catalytic electronically conductive support structure 106a, a electrochemically active material (e.g., LiOH) 106b and an aqueous electrolyte 106c (e.g., salt water, or aqueous solutions of LiCl, LiBr, LiI, NH$_4$Cl, NH$_4$Br, etc. may act as both the electrochemically active component and the ionically conductive component; In some implementations, an optional separator (not shown) may be provided between the protective membrane 104 and the porous catalytic electronically conductive support structure 106a. This separator may be useful to protect the protective membrane from the possibility of being damaged by any roughness on the porous catalytic electronically conductive support structure 106a and may provide a fluid reservoir for the aqueous cathode active material/electrolyte 106b/106c. It may be composed of a polyolefin such as polyethylene or polypropylene, for example a CELGARD separator.

In many cases, an aqueous electrolyte provides ion carriers for transport (conductivity) of Li ions. As noted above, the electrochemically active component (e.g., LiOH) and the ionically conductive component (e.g., aqueous electrolyte) will be intermixed as a single solution, although they are conceptually separate elements of the cell. Suitable electrolytes for a Li electrolyzer cell of the invention include any aqueous electrolyte with suitable ionic conductivity. Suitable electrolytes may be acidic, for example, strong acids like HCl, H$_2$SO$_4$, H$_3$PO$_4$ or weak acids like acetic acid/Li acetate; basic, for example, LiOH; neutral, for example, sea water, LiCl, LiBr, LiI; or amphoteric, for example, NH$_4$Cl, NH$_4$Br, etc.

The electrochemical reaction that occurs in a Li aqueous electrolyzer cell is a redox reaction in which the electrochemically active anode material gets oxidized while reduction occurs at the cathode to generate pure active metal. As noted above, while not so limited, in a Li aqueous electrolyzer cell, the cell reaction is believed to be:

$2LiOH = 2Li + H_2O + \frac{1}{2}O_2$.

The half-cell reactions at the anode and cathode, respectively, are believed to be:

Anode: $2LiOH = 2Li^+ + 2e^- + H_2O + \frac{1}{2}O_2$

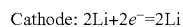

Cathode: $2Li + 2e^- = 2Li$

The anode catalyst promotes electron transfer to generate Li$^+$ ions from a Li metal salt, LiOH for example. Any suitable catalytic electronically conductive support structure sufficiently porous so that surface area is maximized without limiting mass transfer of the electrochemically active material may be used in the electrolyzer cells of the present invention. Suitable porous support materials include those that are inherently electronically conductive and those that are treated (e.g., coated) to become electronically conductive. Supports composed of a porous material that is not electronically conductive (but possibly ionically conductive) include alumina, silica glass, ceramics, glass-ceramics and water-stable polymers. The insulating support is metallized in order to carry current. Insulating supports can be metallized by a process known as electroless deposition in which a catalyst and reducing agent are adsorbed onto the surface of the insulator before exposing it to a solution of metal ions in solution which are reduced to metal on the surface according to techniques known in the art. Common, inexpensive catalysts for this reaction are nickel and copper; precious metals like Pt, Pd, Ru, Au, etc. will also work but are more expensive. Nickel is particularly preferred for its catalytic properties (particularly in Li/water cells).

Suitable glass, ceramic, and glass-ceramic supports can be an inert material, or made from an ionically conductive material such as are suitable for the protective membrane described herein. The porous support may be made through tape-casting or extrusion of a glass or ceramic or glass-ceramic powder/polymer binder/solvent mixture. Onto the porous support a second layer of finer glass or ceramic or glass-ceramic powder could be laid down by tape-casting or extrusion such that when the two-layer article is fired, the coarse support layer retains porosity while the thin-film densifies completely to become the a component of the protective membrane. Alternatively, the support layer could be pre-fired, and then a thin-film laid down by tape-casting or extrusion, and fired to full density.

A glass, ceramic or glass-ceramic component of the protective membrane can also be applied by melt-spray techniques, such as plasma-spray and vacuum plasma-spray, or other thermal spray techniques; such films may also need heat treatment as described as described in the publication Jie Fu, *J. Amer. Ceram. Soc.*, 80 [7] p. 1901-1903 (1997) and the patents of OHARA Corp., cited and incorporated by reference herein, to improve the ionic conductivity of the solid In such processes, the membrane material may be supplied to a plasma torch nozzle as a powder, and sprayed out of the nozzle as fine molten droplets. The molten droplets hit the substrate and solidify. In this manner, a glass, ceramic or glass-ceramic film can be directly deposited onto dense or porous substrates to produce either a porous or dense film, depending on operating parameters. The solid electrolyte membrane can also be fabricated by a process known as draw-down where an amorphous glass is drawn to thin sheets at an appropriate temperature whereby the viscosity of the glass is suitable for drawing, in a continuous fashion, allowing high volume production of glass sheets or tubes where the sheet or wall thickness is in the range of 10 microns to 500 microns. The draw-down membranes are then heat-treated, as described in Fu, referenced above, to form sheet or tubular glass-ceramic membranes.

Suitable polymeric supports include polyethylene, polypropylene, Kevlar, Nylon, etc. As an example, a thin glass-ceramic layer may be tape-cast and fired to full density. Then the polymeric support would be deposited onto the glass-ceramic film by tape-casting of a polymer/binder/solvent film, and allowed to dry.

Suitable inherently electronically conductive supports included co-fired and pre-fired metals. A porous stainless steel support may be fabricated through tape-casting or extrusion. Onto the porous support, a thin glass or glass-ceramic layer could be deposited by tape-casting. The 2-layer structure could then be fired at low temperature (e.g., <900° C.) in air, or at higher temperatures under reducing conditions (e.g., $H_2$ furnace) to minimize oxidation of the stainless steel support during sintering. A porous nickel support could be fabricated as described above, but would have to be fired under reducing conditions to prevent oxidation of Ni to NiO. Alternatively, the porous support is pre-fired to the desired porosity. A second layer of glass-ceramic could be applied to the porous support by tape-casting, aerosol-spray coating, electrophoretic deposition, etc. Since the substrate will not sinter during firing (since it is pre-sintered), the film will undergo constrained sintering (constrained by a non-sintering substrate). Since the film is a glass and can flow during firing, this is not a problem.

Non-catalytic porous supports are impregnated with a catalyst to facilitate the reduction of water for reaction with the Li ions from the anode that pass through the protective layer.

In the case of the nickel support, the nickel surface is catalytic for the reduction of water, and so, catalyst impregnation is probably unnecessary for that application.

Protective Membranes and Structures

The present invention concerns alkali (or other active) metal electrolyzer (electrolytic) cells. The cell negative electrode (cathode) has a highly ionically conductive (at least about $10^{-7}$ S/cm, and more preferably at least $10^{-6}$ S/cm, for example $10^{-5}$ S/cm to $10^{-4}$ S/cm, and as high as $10^{-3}$ S/cm or higher) protective membrane adjacent to the cathode that effectively isolates (de-couples) the active metal electrode from solvent, electrolyte and/or cathode environments, including such environments that are normally highly corrosive to Li or other active metals, and at the same time allows ion transport in and out of these potentially corrosive environments. The protective membrane is thus chemically compatible with active metal (e.g., lithium) on one side and a wide array of materials, including those including those that are normally highly corrosive to Li or other active metals on the other side, while at the same time allowing ion transport from one side to the other. In this way, a great degree of flexibility is permitted the other components of the electrochemical device, in particular, the source of active metal ions on the anode side of the membrane. Isolation of the anode from other components of a the cell in this way allows the use of virtually any solvent, electrolyte and/or anode material in conjunction with the active metal cathode.

Such a protected active metal cathode may be used with a wide array of solvents, electrolytes and cathode materials (including those more stable in lithium metal systems, such as are used in lithium-sulfur battery systems described in the patents of PolyPlus Battery Company, for example, U.S. Pat. Nos. 6,025,094, issued Feb. 15, 2000, 6,402,795, issued Jun. 11, 2002, 6,214,061, issued Apr. 10, 2001 and 6,413,284, issued Jul. 2, 2002, and U.S. patent application Ser. No. 10/686,189, filed Oct. 14, 2003, each of which is incorporated by reference herein in its entirety for all purposes); and more Li-corrosive materials including water, ionic (including protic) solutions, aqueous electrolytes, molten salts, and ionic liquids, for example), operating conditions (including high through low temperatures) and discharge rate regimes (including high through low discharge rates). Active metal corrosion is not an issue and the anode electrolyte compatibility with the cathode is not a concern.

The present invention uses ionically conductive membranes for decoupling the active metal cathode and anode sides of an active metal electrolytic cell. The membranes may be incorporated in electrolytic cells and cell precursors. The membranes are highly conductive for ions of the active metal, but are otherwise substantially impervious. They are chemically stable on one side to the active metal of the cathode (e.g., lithium), and on the other side to the anode, including its active metal corrosive constituents, such as aqueous active metal salt solutions (e.g., LiOH).

The membrane may have any suitable composition, for example, it may be a monolithic material chemically compatible with both the anode and cathode environments, or a composite composed of at least two components of different materials having different chemical compatibilities, one chemically compatible with the anode environment and the other chemically compatible with the cathode environment.

Composite membranes may be composed of at least two components of different materials having different chemical compatibility requirements. The composite may be composed of a laminate of discrete layers of materials having different chemical compatibility requirements, or it may be composed of a gradual transition between layers of the materials. By "chemical compatibility" (or "chemically compatible") it is meant that the referenced material does not react to form a product that is deleterious to cell operation when contacted with one or more other referenced cell components or manufacturing, handling or storage conditions.

A first material layer of the composite is both ionically conductive and chemically compatible with an active metal electrode material. Chemical compatibility in this aspect of the invention refers to a material that is chemically stable and therefore substantially unreactive when contacted with an active metal. Active metals are highly reactive in ambient conditions and can benefit from a barrier layer when used as electrodes. They are generally alkali metals such (e.g., lithium, sodium or potassium), alkaline earth metals (e.g., calcium or magnesium), and/or certain transitional metals (e.g., zinc), and/or alloys of two or more of these. The following active metals may be used: alkali metals (e.g., Li, Na, K), alkaline earth metals (e.g., Ca, Mg, Ba), or binary or ternary alkali metal alloys with Ca, Mg, Sn, Ag, Zn, Bi, Al, Cd, Ga, In. Preferred alloys include lithium aluminum alloys, lithium silicon alloys, lithium tin alloys, lithium silver alloys, and sodium lead alloys (e.g., $Na_4Pb$). A preferred active metal electrode is composed of lithium. Chemical compatibility also refers to a material that may be chemically stable with oxidizing materials and reactive when contacted with an active metal electrode material to produce a product that is chemically stable against the active metal electrode material and has the desirable ionic conductivity (i.e., a first layer material). Such a reactive material is sometimes referred to as a "precursor" material.

A second material layer of the composite is substantially impervious, ionically conductive and chemically compatible with the first material. By substantially impervious it is meant that the material provides a sufficient barrier to cell electrolytes and solvents and other cell component materials that would be damaging to the active metal electrode material to prevent any such damage that would degrade electrode performance from occurring (e.g., oxidation). Thus, it should be non-swellable and free of pores, defects, and any pathways allowing air, moisture, electrolyte, etc. to penetrate though it to the first material. Preferably, the second material layer is so impervious to ambient moisture, carbon dioxide, oxygen, etc. that an encapsulated active metal electrode can be handled under ambient conditions without the need for elaborate dry box conditions as typically employed to process other lithium electrodes.

In addition to the protective composite laminate structure described above, a protective composite in accordance with the present invention may alternatively be a functionally graded layer, as further described below.

It should be noted that the first and second materials are inherently ionically conductive. That is, they do not depend on the presence of a liquid electrolyte or other agent for their ionically conductive properties.

Additional layers are possible to achieve these aims, or otherwise enhance electrode stability or performance. All layers of the composite have high ionic conductivity, at least $10^{-7}$ S/cm, generally at least $10^{-6}$ S/cm, for example at least $10^{-5}$ S/cm to $10^{-4}$ S/cm, and as high as $10^{-3}$ S/cm or higher so that the overall ionic conductivity of the multi-layer protective structure is at least $10^{-7}$ S/cm and as high as $10^{-3}$ S/cm or higher.

Figures 2A, 2B:
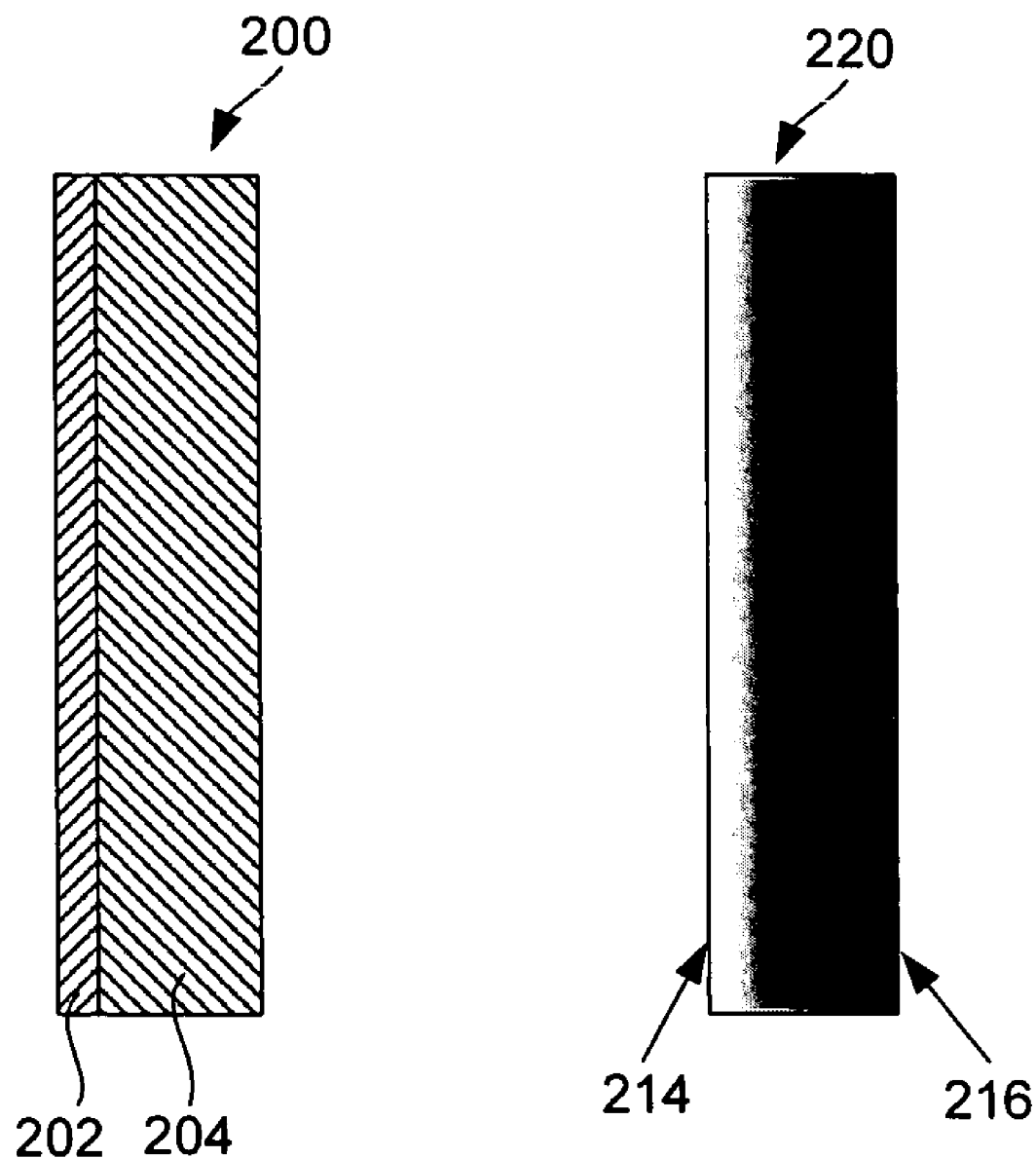
FIGS. 2A and B are a schematic illustrations of ionically conductive protective membrane battery separators in accordance with the present invention.

FIG. 2A illustrates a protective membrane composite battery separator suitable for use in an electrolytic cell in accordance with one embodiment of the present invention. The separator 200 includes a laminate of discrete layers of materials with different chemical compatibilities. A layer of a first material or precursor 202 is ionically conductive and chemically compatible with an active metal. In most cases, the first material is not chemically compatible with oxidizing materials (e.g., air, moisture, etc). The first layer, in contact with the active metal, may be composed, in whole or in part, of active metal nitrides, active metal phosphides, active metal halides or active metal phosphorus oxynitride-based glasses. Specific examples include $Li_3N$, $Li_3P$, LiI, LiBr, LiCl and LiF. In at least one instance, LiPON, the first material is chemically compatible with oxidizing materials. The thickness of the first material layer is preferably about 0.1 to 5 microns, or 0.2 to 1 micron, for example about 0.25 micron. This layer may also be a semi-permeable membrane separator impregnated with a non-aqueous liquid or gel, for example, a micro-porous polymer impregnated with a liquid or gel phase, such as are used traditionally used in lithium metal batteries. For example, such as a microporous separator immersed in a liquid, e.g., propylene carbonate (PC), dimethoxy ether (DME), or a non-aqueous gel, e.g., polyethylene oxide (PEO) or polyacrylonitrile (PAN) swollen with PC or DME, may be used for the first layer.

As noted above, the first material may also be a precursor material which is chemically compatible with an active metal and reactive when contacted with an active metal electrode material to produce a product that is chemically stable against the active metal electrode material and has the desirable ionic conductivity (i.e., a first layer material). Examples of suitable precursor materials include metal nitrides, red phosphorus, nitrogen and phosphorus containing organics (e.g., amines, phosphines, borazine ($B_3N_3H_6$), triazine ($C_3N_3H_3$)) and halides. Some specific examples include P (red phosphorus), $Cu_3N$, $SnN_x$, $Zn_3N_2$, $FeN_x$, $CoN_x$, aluminum nitride ($Al_3N$), silicon nitride ($Si_3N_4$) and $I_2$, $Br_2$, $Cl_2$ and $F_2$. Such precursor materials can subsequently react with active metal (e.g., Li) to form Li metal salts, such as the lithium nitrides, phosphides and halides described above. In some instances, these first layer material precursors may also be chemically stable in air (including moisture and other materials normally present in ambient atmosphere), thus facilitating handling and fabrication. Examples include metal nitrides, for example $Cu_3N$.

Also, a suitable active metal compatible layer may in some instances include a polymer component to enhance its properties. For example, polymer-iodine complexes like poly(2-vinylpyridine)-iodine (P2VP-$I_2$), polyethylene-iodine, or with tetraalkylammonium-iodine complexes can react with Li to form a LiI-based film having significantly higher ionic conductivity than that for pure LiI.

The ionic conductivity of the first material is high, at least $10^{-7}$ S/cm, generally at least about $10^{-5}$ S/cm, and may be as high as $10^{-3}$ S/cm or higher.

Adjacent to the first material or precursor layer 202 is a second layer 204 that is substantially impervious, ionically conductive and chemically compatible with the first material or precursor and environments normally corrosive to active metal, including glassy or amorphous metal ion conductors, such as a phosphorus-based glass, oxide-based glass, phosphorus-oxynitride-based glass, sulpher-based glass, oxide/sulfide based glass, selenide based glass, gallium based glass, germanium-based glass or boracite glass (such as are described D. P. Button et al., Solid State Ionics, Vols. 9-10, Part 1, 585-592 (December 1983); ceramic active metal ion conductors, such as lithium beta-alumina, sodium beta-alumina, Li superionic conductor (LISICON), Na superionic conductor (NASICON), and the like; or glass-ceramic active metal ion conductors. Specific examples include LiPON, $Li_3PO_4.Li_2S.SiS_2$, $Li_2S.GeS_2.Ga_2S_3$, $Li_2O.11Al_2O_3$, $Na_2O.11Al_2O_3$, $(Na, Li)_{1+x}Ti_{2-x}Al_x(PO_4)_3$ ($0.6 \leq x \leq 0.9$) and crystallographically related structures, $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, $Li_5ZrP_3O_{12}$, $Li_5TiP_3O_{12}$, $Li_3Fe_2P_3O_{12}$ and $Li_4NbP_3O_{12}$, and combinations thereof, optionally sintered or melted. Suitable ceramic ion active metal ion conductors are described, for example, in U.S. Pat. No. 4,985,317 to Adachi et al., incorporated by reference herein in its entirety and for all purposes.

A particularly suitable glass-ceramic material for the second layer of the protective composite is a lithium ion conductive glass-ceramic having the following composition:

| Composition | mol % |
| --- | --- |
| $P_2O_5$ | 26-55% |
| $SiO_2$ | 0-15% |
| $GeO_2 + TiO_2$ | 25-50% |
| in which $GeO_2$ | 0-50% |
| $TiO_2$ | 0-100% |
| $ZrO_2$ | 0-10% |
| $M_2O_3$ | 0 < 10% |
| $Al_2O_3$ | 0-15% |
| $Ga_2O_3$ | 0-15% |
| $Li_2O$ | 3-25% | and containing a predominant crystalline phase composed of $Li_{1+x}(M,Al,Ga)_x(Ge_{1-y}Ti_y)_{2-x}(PO_4)_3$ where $X \leq 0.8$ and $0 \leq Y \leq 1.0$, and where M is an element selected from the group consisting of Nd, Sm, Eu, Gd, Th, Dy, Ho, Er, Tm and Yb and/or and $Li_{1+x+y}Q_xTi_{2-x}Si_yP_{3-y}O_{12}$ where $0 \leq X \leq 0.4$ and $0 \leq Y \leq 0.6$, and where Q is Al or Ga. The glass-ceramics are obtained by melting raw materials to a melt, casting the melt to a glass and subjecting the glass to a heat treatment. Such materials are available from OHARA Corporation, Japan and are further described in U.S. Pat. Nos. 5,702,995, 6,030,909, 6,315,881 and 6,485,622, incorporated herein by reference.

The high conductivity of some of these glasses, ceramics and glass-ceramics (ionic conductivity in the range of about $10^{-7}$ to $10^-$ S/cm or greater) may enhance performance of the electrolytic cell, and allow relatively thick films to be deposited without a large penalty in terms of ohmic resistance.

Either layer may also include additional components. For instance, a suitable active metal compatible layer (first layer) may include a polymer component to enhance its properties. For example, polymer-iodine complexes like poly(2-vinylpyridine)-iodine ($P2VP-I_2$), polyethylene-iodine, or tetraalkylammonium-iodine complexes can react with Li to form a LiI-based film having significantly higher ionic conductivity than that for pure LiI. Also, a suitable first layer may include a material used to facilitate its use, for example, the residue of a thin wetting layer (e.g., Ag) used to prevent reaction between vapor phase lithium (during deposition) and LiPON when LiPON is used as a first layer material.

In addition, the layers may be formed using a variety of techniques. These include deposition or evaporation (including e-beam evaporation) or thermal spray techniques such as plasma spray of layers of material, such as $Li_3N$ or an ionically conductive glass (e.g., LiPON). Also, as noted above, the active metal electrode adjacent layer may be formed in situ from the non-deleterious reaction of one or more precursors with the active metal electrode. For example, a $Li_3N$ layer may be formed on a Li cathode by contacting $Cu_3N$ with the Li cathode surface, or $Li_3P$ may be formed on a Li cathode by contacting red phosphorus with the Li cathode surface.

The composite barrier layer should have an inherently high ionic conductivity. In general, the ionic conductivity of the composite is at least $10^{-7}$ S/cm, generally at least about $10^{-6}$ to $10^{-5}$ S/cm, and may be as high as $10^{-4}$ to $10^{-3}$ S/cm or higher. The thickness of the first precursor material layer should be enough to prevent contact between the second material layer and adjacent materials or layers, in particular, the active metal of the cathode with which the separator is to be used. For example, the first material layer may nave a thickness of about 0.1 to 5 microns; 0.2 to 1 micron; or about 0.25 micron.

The thickness of the second material layer is preferably about 0.1 to 1000 microns, or, where the ionic conductivity of the second material layer is about $10^{-7}$ S/cm, about 0.25 to 1 micron, or, where the ionic conductivity of the second material layer is between about $10^{-4}$ about $10^{-3}$ S/cm, about 10 to 1000 microns, preferably between 1 and 500 microns, and more preferably between 10 and 100 microns, for example 20 microns.

In addition to the protective composite laminates described above, a protective composite in accordance with the present invention may alternatively be compositionally and functionally graded, as illustrated in FIG. 2B. Through the use of appropriate deposition technology such as RF sputter deposition, electron beam deposition, thermal spray deposition, and or plasma spray deposition, it is possible to use multiple sources to lay down a graded film. In this way, the discrete interface between layers of distinct composition and functional character is replaced by a gradual transition of from one layer to the other. The result, as with the discrete layer composites described above, is a bi-functionally compatible ionically conductive composite 220 stable on one side 214 to lithium or other active metal (first material), and on the other side 216 substantially impervious and stable to active metal corrosive environments, such as aqueous solutions of active metal salts in the anode of an electrolytic cell (second material). In this embodiment, the proportion of the first material to the second material in the composite may vary widely based on ionic conductivity and mechanical strength issues, for example. In many, but not all, embodiments the second material will dominate. For example, suitable ratios of first to second materials may be 1-1000 or 1-500, for example about 1 to 200 where the second material has greater strength and ionic conductivity than the first (e.g., 2000 Å of LiPON and 20-30 microns of a glass-ceramic such as described herein). The transition between materials may occur over any (e.g., relatively short, long or intermediate) distance in the composite.

A protective membrane in accordance with the present invention may be formed using a variety of methods. These include deposition or evaporation. Protective membrane composites of the present invention may be formed by deposition or evaporation (including e-beam evaporation) of the first layer of material or precursor on the second layer of material. Also, as noted above, the first layer may be formed in situ from the non-deleterious reaction of one or more precursors with an active metal electrode or material, by deposition or evaporation of lithium on the precursor, by direct contact of the precursor with a lithium metal (e.g., foil), or by plating of the precursor with lithium through a second layer material. In some embodiments, the second layer material may also be formed on the first layer material.

Electrolytic Cell Fabrication and Operation

Methods of making the protective membranes and electrochemical cell structures incorporating them are described in detail in U.S. patent application Ser. No. 10/772,228 filed Feb. 3, 2004, titled IONICALLY CONDUCTIVE MEMBRANES FOR PROTECTION OF ACTIVE METAL ANODES AND BATTERY CELLS; U.S. patent application Ser. No. 10/772,157 filed Feb. 3, 2004, titled ACTIVE METAL/AQUEOUS ELECTROCHEMICAL CELLS AND SYSTEMS; and the applications from which they claim priority. These applications are incorporated by reference herein in their entirety for all purposes. As can be ascertained form these prior applications, an electrolytic cell or cell precursor such as depicted in FIG. 1 may be formed by a variety of techniques. Other fabrication techniques not explicitly described but which are apparent to those of skill in the art may, or course, also be used.

In one example, illustrated in FIG. 3, a thin, Li-ion conducting glass-ceramic film can be formed using plasma-spray and other deposition techniques. A laminate protective composite membrane is formed on a porous nickel catalytic electronically conductive support for use in an electrolytic cell in accordance with the present invention. An advantage of using plasma-spray is that the substrate can be maintained at a relatively low temperature; so, for example the porous nickel support will be at a sufficiently low temperature (below about 500° C.) that the conversion of Ni to NiO is prevented. The porous Ni support is then covered with a thin glass-ceramic (or other suitable second protective membrane composite component) film by plasma-spray. A subsequent lithium compatible (first component) layer of LiPON or other suitable materials such as $Cu_3N$, $Li_3P$, etc. is deposited onto the glass-ceramic film by suitable technique, such as ebeam evaporation, RF sputtering, CVD, or plasma-spray to complete the protective membrane.

At this point, a current collector (108, FIG. 1; not shown in FIG. 3) may be placed on the protective membrane and the composition can serve as a cell precursor. The cell is completed by the subsequent contacting of a source of active metal ions and ionic conductor (e.g., an aqueous LiOH solution obtained by dissolving Li salt from spent Li battery cells) to the porous electronically conductive support, for example by immersing it in an aqueous solution of the active metal ion source. In the actual cell, the lithium metal electrode will be isolated from the aqueous environment by means of a hermetic seal that may be composed of elastomeric or epoxy resins. When voltage, for example about 1.5 to 6 V is applied between the current collector and the porous nickel support, active metal (e.g., Li) is plated onto the current collector through the protective membrane, as described in further detail below. As also described further below, a wetting layer, for example a thin layer of tin or aluminum, may also be applied to the current collector at its interface with the protective membrane in order to enhance plating performance.

Alternatively, it may be desirable in some instances to start the electrolytic cell with some active metal already in the cathode. It these instances, Li metal may be deposited or evaporated onto the protective membrane prior to application of the current collector. Where LiPON is used as the active metal compatible layer of the protective membrane, it may be desirable to deposit a thin Ag transient coating by vacuum evaporation onto the lithium compatible layer. When lithium is evaporated onto this structure, the Ag is converted to Ag—Li and diffuses, at least in part, into the greater mass of deposited lithium, and a protected lithium electrode is created. The thin Ag coating prevents the hot (vapor phase) lithium from contacting and adversely reaction with the LiPON first material layer. After deposition, the solid phase lithium is stable against the LiPON. A multitude of such transient/wetting (e.g., Sn) and first layer material combinations can be used to achieve the desired result.

The cell or cell precursor may be fabricated in planar or tubular form according to well known techniques in the art addressed in commonly assigned application Ser. No. 10/772, 157, previously incorporated by reference.

Details of an active metal plating process useful for an understanding of the operation of an electrolytic cell in accordance with the present invention are described in commonly assigned U.S. Pat. No. 6,402,795, which is incorporated by reference herein in its entirety.

In operation of an electrolyzer cell in accordance with the present invention for the claiming of lithium, lithium metal is electroplated through the protective membrane onto the cathode or cathode substrate (current collector/wetting layer (108/110, FIG. 1)) from a lithium ion source to produce a lithium electrode. Lithium ions move through protective membrane and contact the current collector where they are reduced to form lithium metal. Thus, the electrolytic cathode ultimately includes a lithium metal layer sandwiched between a current collector and a protective membrane.

Preferably, the current collectors employed with this invention form a physically rigid layer of material that does not alloy with lithium (or other active metal). They should be electronically conductive and unreactive to moisture, gases in the atmosphere (e.g., oxygen and carbon dioxide), electrolytes and other agents they are likely to encounter prior to, during, and after fabrication of a battery. Examples of materials useful as current collectors for this invention include copper, nickel, many forms of stainless steel, zinc, chromium, and compatible alloys thereof. The current collector should not alloy with, easily migrate into, or otherwise detrimentally affect the electrochemical properties of the active metal. In a preferred embodiment, the current collector may have a thickness of between about 1 and 25 micrometers (more preferably between about 6 and 12 micrometers).

In an alternative embodiment, the current collector is provided as a metallized plastic layer. In this case, the current collector may be much thinner than a free-standing current collector. For example, the metal layer on plastic may be in the range of 500 angstroms to 1 micrometer in thickness. Suitable plastic backing layers for use with this type of current collector include polyethylene terephthalate (PET), polypropylene, polyethylene, polyvinylchloride (PVC), polyolefins, polyimides, etc. The metal layers put on such plastic substrates are preferably inert to lithium (e.g., they do not alloy with lithium) and may include at least those materials listed above (e.g., copper, nickel, stainless steel, and zinc). One advantage of this design is that it forms a relatively lightweight backing/current collector for the electrode.

When the current collector is made from a material that docs not allow lithium to plate evenly, for example copper, a "wetting layer" (110, FIG. 1; not shown FIG. 3) may be formed on the current collector to reduce the surface energy at the interface of the plated lithium and the current collector. The wetting layer is sandwiched between current collector and protective membrane. When the cell is operated, lithium is then plated onto the wetting layer and the current collector. The completed active metal electrode in this instance thus has a stack including a current collector as the bottom layer, a single ion conducting protective membrane (e.g., composite) as the top layer, a wetting layer on the current collector, and a lithium metal layer between the wetting layer and the protective layer. The wetting layer may, but need not, integrate into lithium during plating. For example, if wetting layer is deposited as a layer of aluminum, it may form a lithium/aluminum alloy when lithium is plated.

A goal in using the wetting layer of this invention is to prevent the lithium from preferentially plating at one or a few locations where it grows so thick that it cracks the protective membrane. Thus, during the initial plating cycle, the lithium should plate evenly over the current collector surface to avoid cracking.

The wetting material should be chosen to lower the energy of plating. Various materials may serve this function. Two general classes of suitable materials include (1) the materials that alloy with lithium and (2) materials that intercalate lithium. Examples of materials falling into the first class include silicon, magnesium, aluminum, lead, silver, and tin. Materials falling into the second class include carbon, titanium sulfide ($TiS_2$), and iron sulfide ($FeS_2$).

Regardless of which wetting material is chosen, only a rather small amount of it should be employed. If too much of this material is present, it can effect the electrochemical properties of the electrode. Each of these materials will effect the redox potential of the electrodes. In some embodiments, the wetting layer is between about 50 and 1000 angstroms thick.

The wetting material should be formed with as smooth a surface as possible. The r.m.s. thickness of the beginning layer should be no greater than the anticipated thickness of the glass layer to be subsequently deposited. Suitably smooth layers may be deposited by various processes. Examples of suitable processes include physical vapor deposition (e.g. evaporation or sputtering) of aluminum or magnesium wetting layers. Alternatively, chemical vapor deposition may be used to deposit carbon, silicon, titanium sulfide, and iron sulfide. So long as the thickness of the wetting layers are kept relatively thin, (e.g., within 50 to 1000 angstroms thick), it generally will not get too bumpy.

In one embodiment, once the lithium has been formed on the cathode by electrolytic operation of the cell, the chemical energy of the lithium may be discharged by reversing the polarity of the cell and pairing the active metal electrode (now the anode) with an appropriate counter electrode (cathode). The wetting layer preferably remains in place during successive cycles of the electrode. In most cases, the wetting material will remain behind the protective membrane because the protective membrane will not be conductive to ions of the wetting layer. For example, if the protective membrane is a single ion conductor for lithium and the wetting layer is aluminum, aluminum ions will not pass through the protective membrane. Thus, the proper choice of a protective membrane and a wetting layer will ensure that the wetting layer does not migrate throughout the cell employing the electrode. In addition, the wetting layer may be "locked" in place within the matrix of the current collector. Stated another way, the current collector may be chemically modified with a wetting material. In a preferred embodiment, this is accomplished by having a graded composition near the surface of the current collector in which the concentration of the wetting layer material increases toward the surface.

Figure 4:
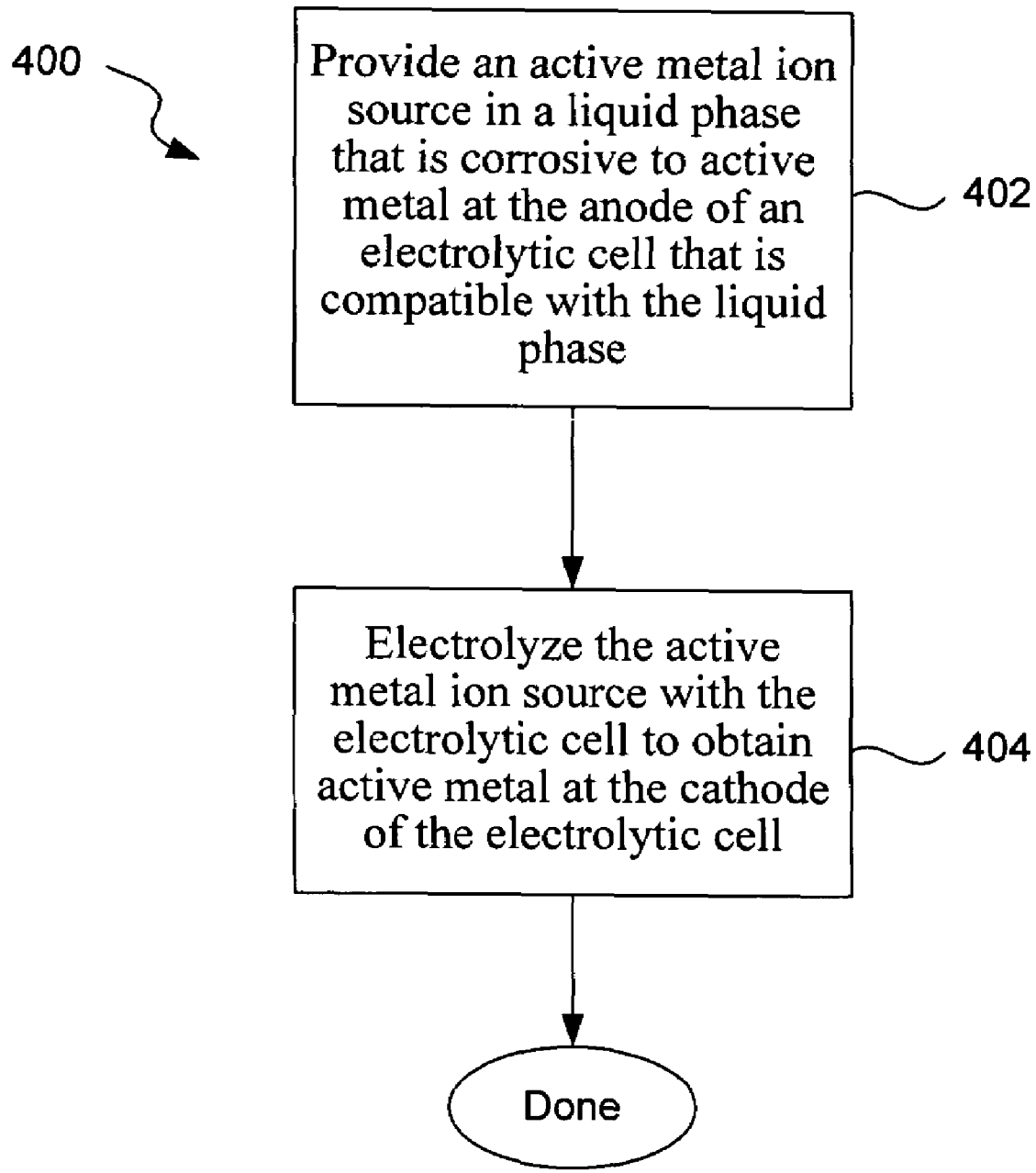
FIG. 4 depicts a process flow of the operation of an electrolyzer cell to claim active metal in accordance with the present invention.

FIG. 4 illustrates a process flow for a method of claiming active metal from an active metal ion source in accordance with the present invention. The method 400 involves providing an active metal ion source in a liquid phase that is corrosive to active metal at the anode of an electrolytic cell that is compatible with the liquid phase (402), and electrolyzing the active metal ion source with the electrolytic cell to obtain active metal at the cathode of the electrolytic cell (404). In a specific embodiment, the method is used to reclaim lithium from spent Li battery cells by dissolving the Li salt from the spent cells in an aqueous solvent and electrolyzing the solution using a cell in accordance with the present invention to recover the pure lithium metal.

CONCLUSION

Active metal electrolyzers (electrolytic cells), electrolytic cell precursors and methods of using the cells to reclaim active metal, such as lithium, from a variety of sources that are corrosive to the active metal have been described.

Although the foregoing invention has been described in some detail for purposes of clarity of understanding, it will be apparent that certain changes and modifications may be practiced within the scope of the appended claims. In particular, while the invention is primarily described with reference to a lithium metal anode, the anode may also be composed of any active metal, in particular, other alkali metals, such as sodium. In addition, while the invention has been primarily described with reference to aqueous solution of active metal salts as active metal ion source, other liquid phase active metal ion sources are also possible, including active metal molten salts. It should be noted that there are many alternative ways of implementing both the process and compositions of the present invention. Accordingly, the present embodiments are to be considered as illustrative and not restrictive, and the invention is not to be limited to the details given herein.

All references cited herein are incorporated by reference for all purposes.

What is claimed is:

1. A method of claiming active metal from an active metal ion source, the method comprising:

providing, at the anode of an electrolytic cell, an active metal ion source in a liquid phase that is corrosive to active metal but compatible with an anode structure; and electrolyzing the active metal ion source with the electrolytic cell to obtain the active metal at the cathode of the electrolytic cell, wherein the electrolytic cell comprises:

the cathode, the anode structure, at the anode, comprising an electronically conductive component, an ionically conductive component, and the active metal ion source in a liquid phase, and an ionically conductive membrane, with a first surface and a second surface, positioned between the cathode and the anode structure, wherein the first surface comprises a material chemically compatible with the cathode and in contact with the cathode, selected from the group consisting of active metal nitrides, active metal phosphides, active metal phosphorus oxynitride glass, and a semi-permeable membrane separator impregnated with a non-aqueous liquid or gel, and wherein the second surface comprises a material substantially impervious to and chemically compatible with the anode structure and in contact with the anode structure, selected from the group consisting of glassy or amorphous metal ion conductors, ceramic active metal ion conductors, and glass-ceramic active metal ion conductors.

2. The method of claim 1, wherein the active metal is obtained in the solid state.

3. The method of claim 1, wherein the active metal ion source in a liquid phase comprises an active metal salt dissolved in a solvent that is corrosive to the active metal.

4. The method of claim 3, wherein the solvent is selected from the group consisting of water, aqueous electrolyte, acid, base, other protic and aprotic solvents, and combinations thereof.

5. The method of claim 4, wherein the solvent is water.

6. The method of claim 4, wherein the solvent is an aqueous electrolyte.

7. The method of claim 3, wherein the cell is operated by applying a voltage across the electrodes causing oxidation of the active metal salt at the anode structure, active metal ion transport through the membrane to the cathode, and reduction of the active metal ions to the active metal at the cathode.

8. The method of claim 7, wherein the method is conducted at room temperature.

9. The method of claim 7, wherein the voltage is about 1.5 to 6 V.

10. The method of claim 7, wherein the cathode initially comprises the active metal.

11. The method of claim 7, wherein the cathode initially is a substrate for active metal plating.

12. The method of claim 11, wherein the substrate comprises a current collector.

13. The method of claim 12, wherein the substrate further comprises a wetting layer.

14. The method of claim 1, wherein the active metal is an alkali metal.

15. The method of claim 14, wherein the alkali metal is lithium.

16. The method of claim 1, wherein the first surface of the ionically conductive membrane comprises a material selected from the group consisting of $Li_3N$, $Li_3P$, and LiPON.

17. The method of claim 1, wherein the first surface of the ionically conductive membrane comprises a semi-permeable membrane separator impregnated with a non-aqueous liquid or gel.

18. The method of claim 17, wherein the non-aqueous liquid or gel is a liquid selected from the group consisting of propylene carbonate (PC) and dimethoxy ether (DME).

19. The method of claim 17, wherein the non-aqueous liquid or gel is a gel selected from the group consisting of polyethylene oxide (PEO) and polyacrylonitrile (PAN) swollen with PC or DME.

20. The method of claim 1, wherein the active metal ion source is selected from the group consisting of industrial waste and spent battery cells.

* * * * *

UNITED STATES PATENT AND TRADEMARK OFFICE
CERTIFICATE OF CORRECTION

PATENT NO. : 7,608,178 B2  Page 1 of 1
APPLICATION NO. : 10/986441
DATED : October 27, 2009
INVENTOR(S) : De Jonghe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1355 days.

Signed and Sealed this

Twelfth Day of October, 2010

David J. Kappos
*Director of the United States Patent and Trademark Office*